(12) United States Patent
Herron

(10) Patent No.: US 10,242,599 B1
(45) Date of Patent: **\*Mar. 26, 2019**

(54) SKULL MOUNT

(71) Applicant: Terence Ward Herron, Paola, KS (US)

(72) Inventor: Terence Ward Herron, Paola, KS (US)

( * ) Notice: Subject to any disclaimer, the term of this patent is extended or adjusted under 35 U.S.C. 154(b) by 434 days.

This patent is subject to a terminal disclaimer.

(21) Appl. No.: 14/887,474

(22) Filed: Oct. 20, 2015

Related U.S. Application Data

(63) Continuation-in-part of application No. 14/658,336, filed on Mar. 16, 2015, now Pat. No. 9,626,881.

(60) Provisional application No. 62/124,869, filed on Jan. 5, 2015.

(51) Int. Cl.
*B44C 5/02* (2006.01)
*G09B 23/36* (2006.01)

(52) U.S. Cl.
CPC .................................... *G09B 23/36* (2013.01)

(58) Field of Classification Search
USPC ................ 434/262, 263, 267, 274, 295, 296
See application file for complete search history.

(56) References Cited

U.S. PATENT DOCUMENTS

| | | | | |
|---|---|---|---|---|
| 3,301,728 A | * | 1/1967 | Swartz ...................... | G09F 3/10 156/220 |
| 4,464,440 A | * | 8/1984 | Dotzman .................. | B44C 5/02 428/16 |
| 4,971,865 A | * | 11/1990 | Nowlan ..................... | B44C 5/02 248/295.11 |
| D343,373 S | * | 1/1994 | Nelson ......................... | D11/133 |
| 5,453,307 A | * | 9/1995 | Rezmer ..................... | B44C 5/02 428/16 |
| 5,472,765 A | * | 12/1995 | Green ....................... | B44C 5/02 428/16 |
| 5,779,294 A | * | 7/1998 | Magri ....................... | B44C 5/02 248/496 |
| 6,234,436 B1 | * | 5/2001 | Kump ................... | A47F 5/0823 211/59.1 |
| 7,207,535 B1 | * | 4/2007 | Giuliani ................ | A01M 31/06 248/216.1 |
| 7,243,888 B2 | * | 7/2007 | Peek ......................... | B44C 5/02 248/304 |
| 8,517,741 B1 | * | 8/2013 | McLean ................. | G09B 23/36 434/295 |
| 9,248,696 B2 | * | 2/2016 | Maria ....................... | B44C 5/02 |
| 9,428,003 B2 | * | 8/2016 | Gill, Jr. ..................... | B44C 5/02 |

(Continued)

*Primary Examiner* — Kurt Fernstrom
(74) *Attorney, Agent, or Firm* — Margaret Millikin

(57) ABSTRACT

An adjustable mounting bracket for mounting a skull of an animal onto a wall. The mounting bracket is adjustable so that the angle of the skull can be changed, so that the skull can be rotated from side to side, and so that the stinger that secures the skull to the mounting bracket can be lifted off of the base of the mounting bracket without removing the base from the wall. Each side of the stinger has a pointed stabilizer for engaging the skull to hold it firmly to the stinger. The base can be made in a variety of shapes and designs. One design has a base with an opening therein that forms a picture frame. Adjustment of the mounting bracket does not require any tools. The stinger is removable from the base to facilitate marketing, packaging and distribution and to make it easier to attach a skull.

25 Claims, 7 Drawing Sheets

(56) References Cited

U.S. PATENT DOCUMENTS

| | | | |
|---|---|---|---|
| 9,556,999 B2* | 1/2017 | Niemerg | F16M 11/22 |
| 2006/0154224 A1* | 7/2006 | St. Ama | G09B 23/36 |
| | | | 434/296 |
| 2009/0230260 A1* | 9/2009 | Damin | G09B 23/36 |
| | | | 248/126 |
| 2011/0031363 A1* | 2/2011 | Shaw | B44C 5/02 |
| | | | 248/220.22 |
| 2011/0036959 A1* | 2/2011 | Raby | B44C 5/02 |
| | | | 248/282.1 |

* cited by examiner

SKULL MOUNT

CROSS-REFERENCE TO RELATED APPLICATIONS

The present application claims priority to U.S. patent application Ser. No. 14/658,336 for Skull Mount filed on Mar. 16, 2015, which in turn claims priority to U.S. Provisional Patent Application Ser. No. 62/124,869 for Skull Mount filed on Jan. 5, 2015.

BACKGROUND OF THE INVENTION

1. Field of the Invention

The present invention is an adjustable mounting bracket for mounting a skull of an animal onto a wall or other flat surface. The mounting bracket is adjustable so that the angle at which the skull is held can be changed, so that the mounted skull of the animal can be rotated from side to side, and so that the stinger to which the skull is secured can be lifted off of the base of the mounting bracket without removing the base from the wall to which it is secured. The base is provided with a cut out area that forms a frame behind which can be secured a photo of the person harvesting the animal whose skull is to be secured thereto, i.e. the harvest image, or which can be used to provide information about the harvest, such as date, time, and location of harvest. Additionally, the stinger is provided with a pair of stabilizers that insert into the skull to help lock it in place on the stinger to prevent rotation of the skull on the stinger.

2. Description of the Related Art

Currently when a hunter or other sportsman wishes to mount a trophy head of an animal such as a deer skull or skull of a wild boar, the skull generally must be mounted to a solid block of wood or other secure base that can then be attached to a wall.

These current types of mountings have several limitations. First, because the skull is permanently attached to the base that attaches to the wall, the skull cannot be removed from the wall without removing the base also.

Second, because the skull is permanently attached to the base, the angle of the skull cannot be altered to display the skull more attractively.

Third, also because the skull is permanently attached to the base, the skull cannot be rotated relative to the base to display the skull more attractively.

The present invention addresses all of these problems by providing a skull mount that includes a stinger for attachment to the skull that can be easily removed from the wall mounted base. The angle of the stinger is adjustable and the stinger can be rotated left and right on the base so that the skull can be positioned in the most advantageous arrangement after the base is mounted to the wall.

Additionally, the present invention includes a cut out area that forms a frame behind which can be secured a photo of the person harvesting the animal whose skull is to be secured thereto, i.e. the harvest image, or which can be used to provide information about the harvest, such as date, time, and location of harvest. Also, the stinger is provided with a pair of stabilizers that insert into the skull to help lock it in place on the stinger to prevent rotation of the skull on the stinger. All of the features and functions of the stinger are achieved by forming one piece of material.

SUMMARY OF THE INVENTION

The present invention is an adjustable skull mounting bracket for mounting a skull of an animal onto a wall or other flat surface. The skull mounting bracket is provided with a vertical flat base that can be secured to a wall with fasteners. The base is provided with attachment openings through which fasteners can be inserted to secure the base to a wall.

The flat base has a horizontal arm that extends outward from the base and to which is attached a vertical threaded stud. A stinger bracket is rotatably attached to the threaded stud via a stud opening provided in a proximal end of the stinger bracket so that the stringer bracket extends outward from the base. Washers are provided on the threaded stud on either side of the stinger bracket to allow for free rotation of the stinger bracket, and a nut is provided attached to the threaded stud below the lower washer to hold the stinger bracket and the washers on the threaded stud.

A distal end of the stinger bracket is angled downward and is provided with an inverted v-shaped opening there through for removably receiving a proximal end of an inverted v-shaped stinger.

A threaded knob is also provided rotatably secured on the threaded stud below the nut that secures the stinger bracket. An indented area is provided in the knob so as to allow a groove located in a proximal end of the stinger to removably engage and rest upon the knob's indented area. Rotation of the knob serves to change the angle of the stinger relative to the base.

An animal skull can be attached to the distal end of the stinger so as to display the skull. An opening is provided in the distal end of the stinger to facilitate attachment of a skull to the stinger.

Gravity holds the stinger is held in place within the inverted v-shaped opening of the stinger bracket and resting on the indented area of the knob. Thus, the stinger can easily be lifted off of the knob and pulled through the inverted v-shaped opening of the stringer bracket to remove the stinger from the rest of the skull mounting bracket.

The base is provided with a cut out area that forms a frame behind which can be secured a photo of the person harvesting the animal whose skull is to be secured thereto, i.e. the harvest image, or which can be used to provide information about the harvest, such as date, time, and location of harvest. Additionally, the stinger is provided with a pair of stabilizers that insert into the skull to help lock it in place on the stinger to prevent rotation of the skull on the stinger.

DETAILED DESCRIPTION OF THE PREFERRED EMBODIMENT

Figure 1:
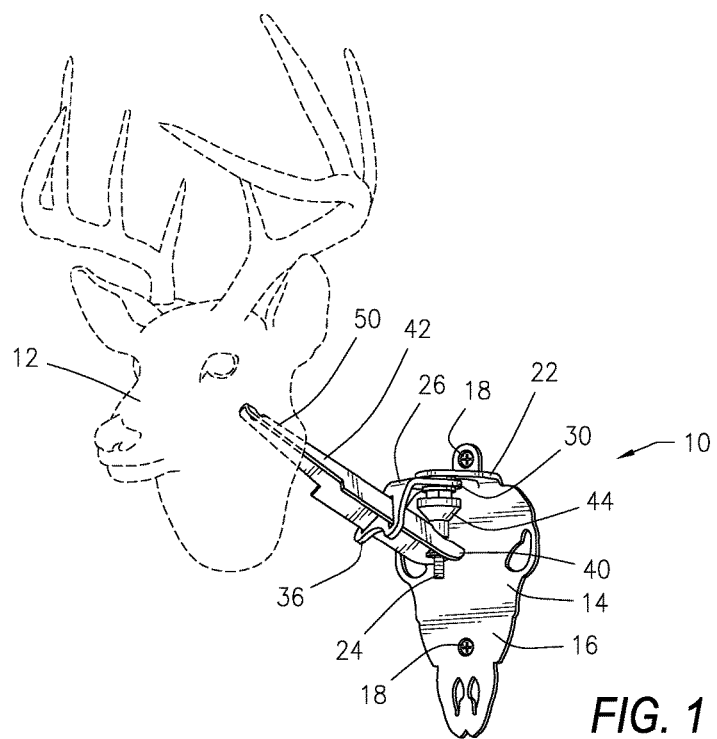
FIG. 1 is a perspective view of a skull mount constructed in accordance with a preferred embodiment of the present invention, and showing in outline and animal skull attached thereto.
Figure 2:
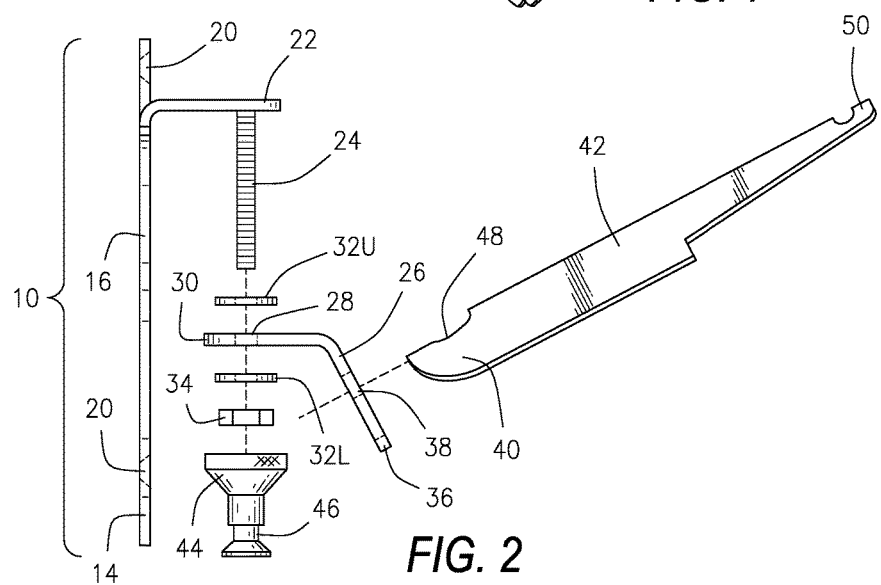
FIG. 2 is an enlarged and exploded side view of the skull mount of FIG. 1.
Figure 4:
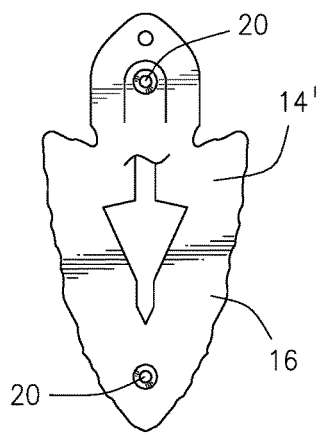
FIG. 4 is an enlarged and flattened out front view of a first alternate base before it is bent and before a threaded stud is attached.
Figure 5:
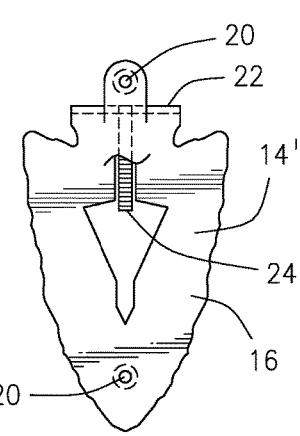
FIG. 5 is a rear view of the first alternate base of FIG. 4 shown bent into its final configuration and with a threaded stud attached parallel to the flat portion of the base.
Figure 6:
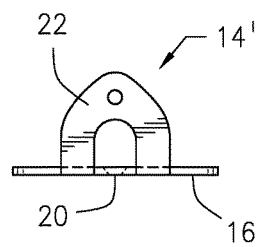
FIG. 6 is a top plan view of the first alternate base of FIG. 4.
Figure 7:
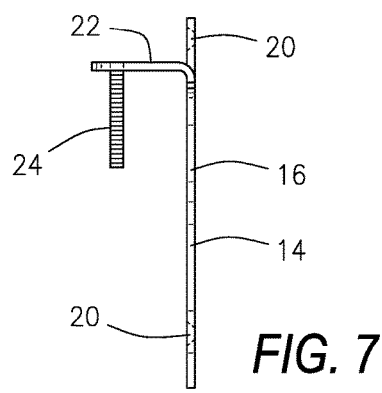
FIG. 7 is a side view of the first alternate base of FIG. 4.
Figure 8:
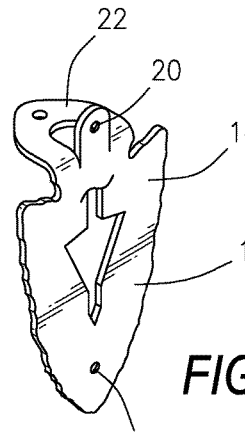
FIG. 8 is a perspective view of the first alternate base of FIG. 4.

Referring now to the drawings and initially to FIGS. 1 and 2, there is illustrated an adjustable skull mount 10 that is constructed in accordance with a preferred embodiment of the present invention. Adjustment of the mounting bracket does not require any tools. The skull mount 10 is an adjustable mounting bracket for mounting a skull 12 of an animal onto a wall or other flat surface. The skull mount 10 of FIG. 1 is shown with an animal skull 12 attached thereto.

Figure 3:
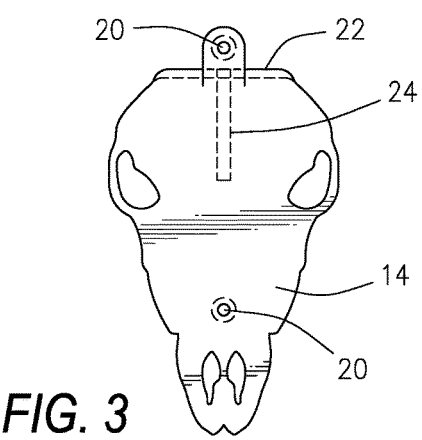
FIG. 3 is an enlarged rear view of the base of the skull mount of FIG. 2 with the attached threaded stud.

Referring also to FIG. 3, the skull mount 10 is provided with a base 14 that has a flat portion 16 that can be secured to a wall or other flat surface with screws or other suitable fasteners 18. The base 14 is provided with attachment openings 20 through which the fasteners 18 can be inserted to secure the base 14 to a wall.

Figure 9:
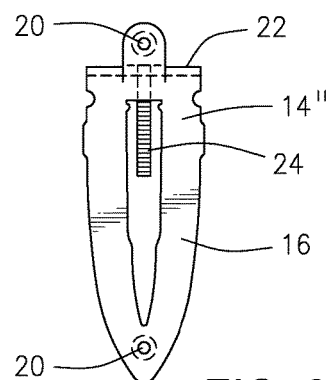
FIG. 9 is an enlarged rear view of a second alternate base.
Figures 10, 11, 12, 13:
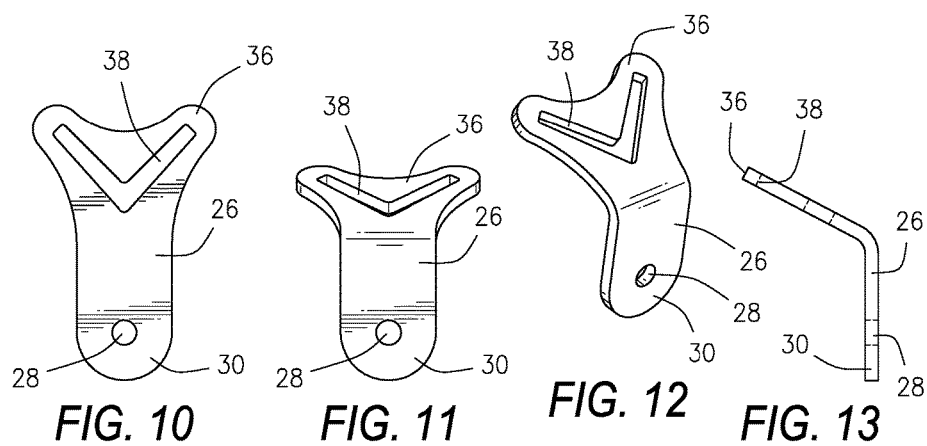
FIG. 10 is an enlarged and flattened out top plan view of the stinger bracket of FIG. 2 before it is bent into its final shape.
FIG. 11 is a top plan view of the stinger bracket of FIG. 10 after it has been bent into its final shape.
FIG. 12 is a top perspective view of the stinger bracket of FIG. 11.
FIG. 13 is a side view of the stinger bracket of FIG. 11.
Figures 14, 15:
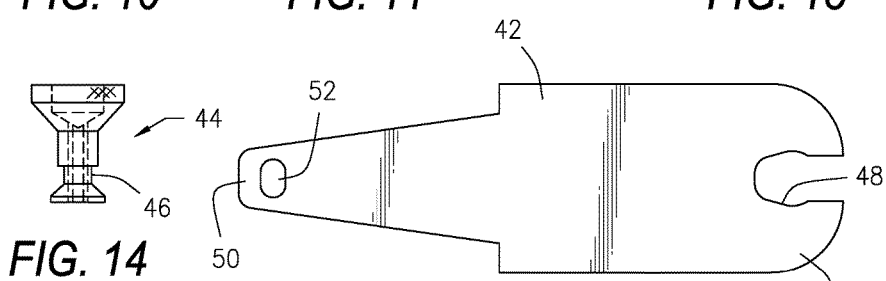
FIG. 14 is an enlarged side view of the knurled knob of FIG. 2.
FIG. 15 is an enlarged and flattened out top plan view of the stinger of FIG. 2 before it is bent into its final shape.
Figures 16, 17:
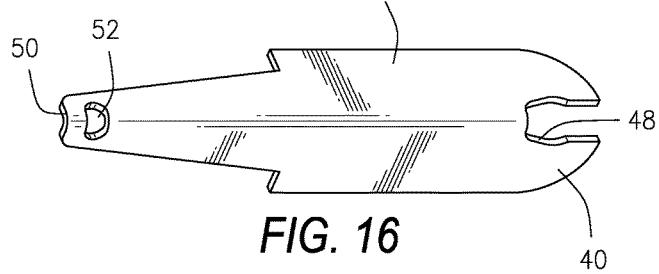
FIG. 16 is a top perspective view of the stinger of FIG. 15 after it has been bent into its final shape.
FIG. 17 is an end view of the stinger of FIG. 16.
Figure 18:
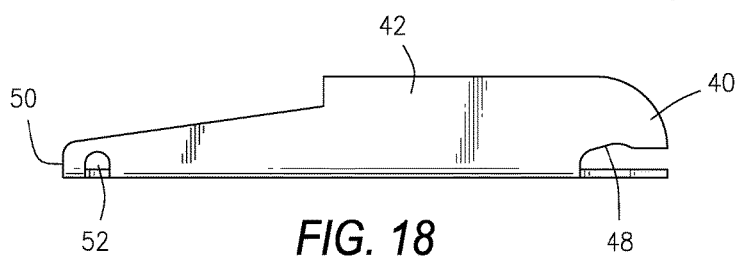
FIG. 18 is a side view of the stinger of FIG. 17 taken along line 18-18

The base 14 may be made in various styles. Three such styles are illustrated. The preferred base 14 is illustrated in FIG. 3 and is in the shape of a skull. A first alternate base 14' is illustrated in FIGS. 4-8 and is in the shape of an arrow. A third alternate base 14" is illustrated in FIG. 9 and is in the shape of a bullet. The invention is not limited to these base designs, but these three designs are provided only as an illustration of the variety of base designs that may be employed with the invention.

It should be noted that the only difference between the base 14 of the preferred embodiment, the first alternate base 14', and the second alternate base 14" is the shape and design of the flat portion 16 of each. In all other respects the bases 14, 14', and 14" are equivalents.

Referring now to FIGS. 4-8, the first alternate base 14' will be described in more detail. The first alternate base 14' has an upper horizontal arm 22 that extends outward from the vertical flat portion 16 of the first alternate base 14' and to which is attached a vertical oriented threaded stud 24. The threaded stud 24 is approximately parallel with the flat portion 16 of the first alternate base 14'.

Referring now again to FIG. 2, a stinger bracket 26 is rotatably attached to the threaded stud 24 via a stud opening 28 provided in a proximal end 30 of the stinger bracket 26 so that the stringer bracket 26 extends outward from the base 14, 14' or 14". Upper and lower washers 32U and 32L are provided on the threaded stud 24 above the stinger bracket 26 and below the stinger bracket 26, respectively, to allow for free rotation of the stinger bracket 26 relative to the base 14, 14' or 14". A nut 34 is provided attached to the threaded stud 24 below the lower washer 32L to hold the stinger bracket 26 and the washers 32U and 32L on the threaded stud 24.

As shown in FIGS. 10-13, a distal end 36 of the stinger bracket 26 is angled downward and is provided with an inverted v-shaped opening 38 extending there through. The inverted v-shaped opening 38 is for removably receiving a proximal end 40 of an inverted v-shaped stinger 42, as will be more fully described hereafter.

Referring to FIGS. 2 and 14-18, a knob 44 is provided rotatably secured on the threaded stud 24 below the nut 34 that secures the stinger bracket 26. An indented area 46 is provided in the knob 44 so as to allow a groove 48 located in the proximal end 40 of the stinger 42 to removably engage and rest upon the knob's indented area 46.

Figure 19:
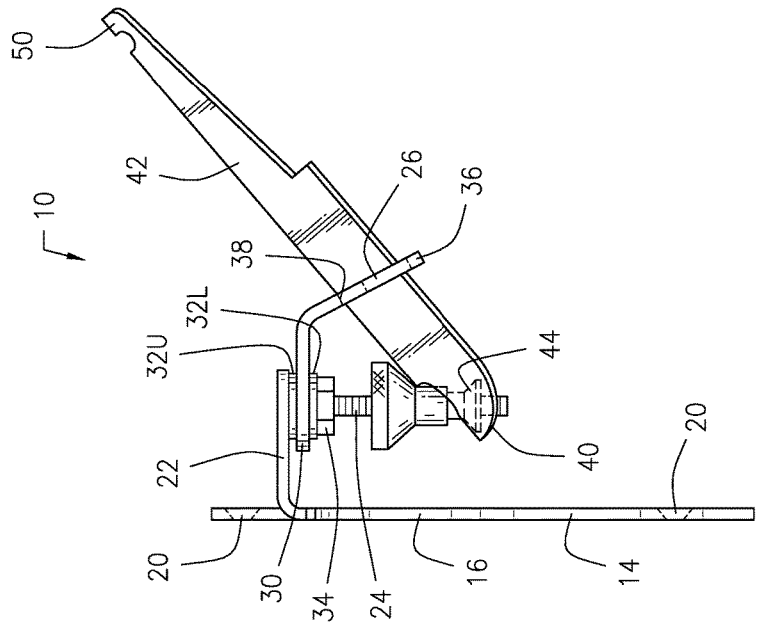
FIG. 19 is a side view of the skull mount of FIG. 2 shown with the knob tightened to increase the angle between the stinger and the flattened portion of the base.
Figure 20:
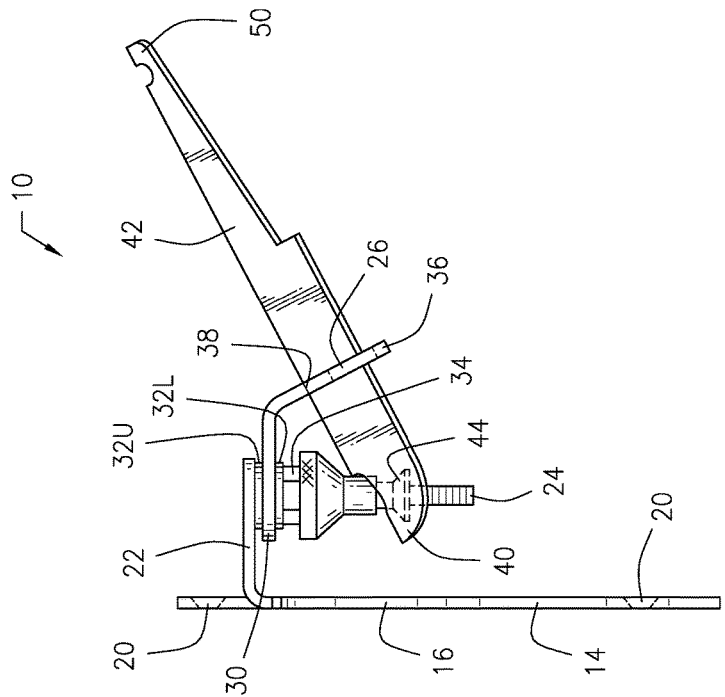
FIG. 20 is a side view of the skull mount of FIG. 19 shown with the knob loosened to decrease the angle between the stinger and the flattened portion of the base.

As illustrated in FIGS. 19 and 20, rotation of the knob 44 serves to change the angle Q of the stinger 42 relative to the flat portion 16 of the base 14, 14' or 14".

Figure 21:
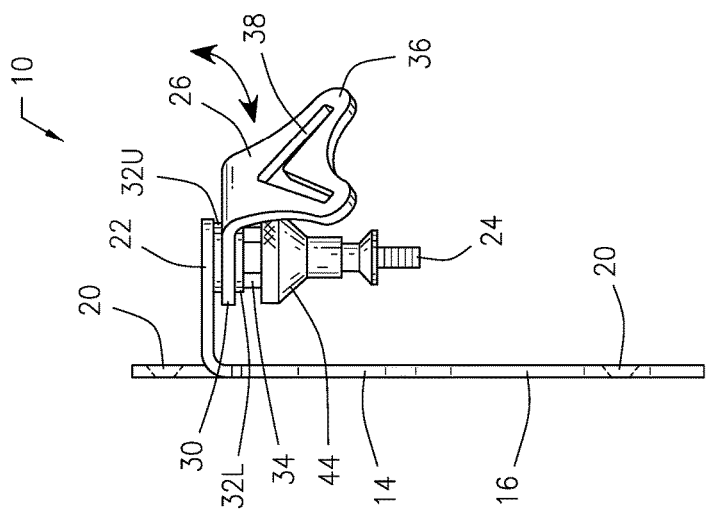
FIG. 21 is a side view of the skull mount of FIG. 2 with the stinger removed for clarity.
Figure 22:
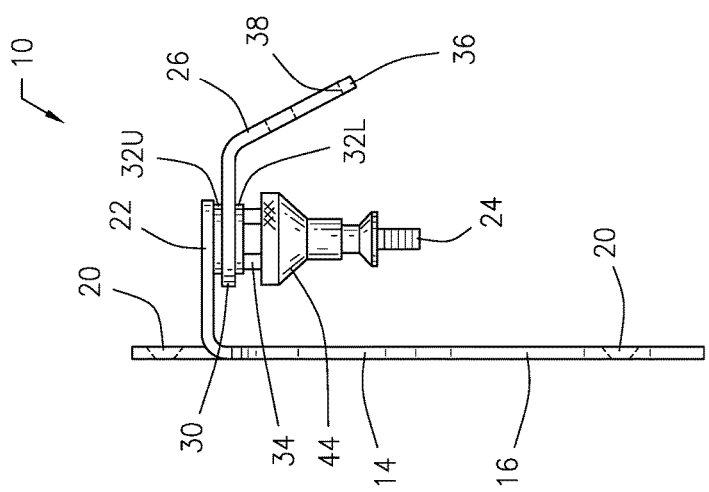
FIG. 22 is a side view of the skull mount of FIG. 21 shown with the stinger bracket rotated.
Figures 23, 24:
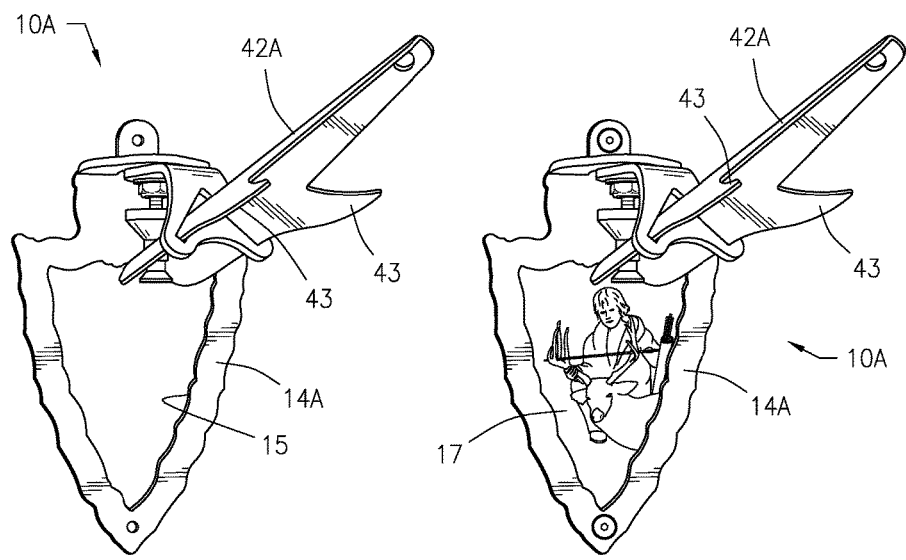
FIG. 23 is front perspective view of an alternate embodiment skull mount that includes a third alternate base having a cut out portion that forms a picture frame and includes an alternate stinger that is provided with a pair of stabilizers on the sides of the alternate stinger.
FIG. 24 is a front perspective view of the alternate embodiment skull mount of FIG. 23 shown with a harvest image secured within the cut out frame of the third alternate base.
Figure 25:
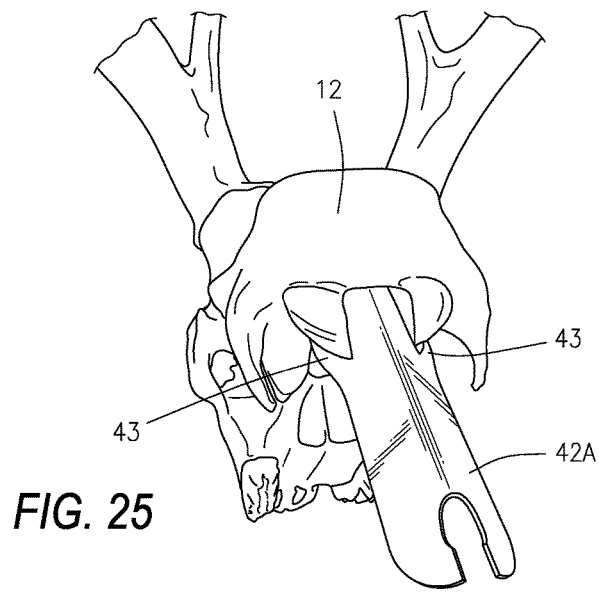
FIG. 25 is a rear perspective view of the alternate stinger of FIGS. 23 and 24 shown removed from the third alternate base and shown with a skull attached to the alternate stinger.
Figure 26:
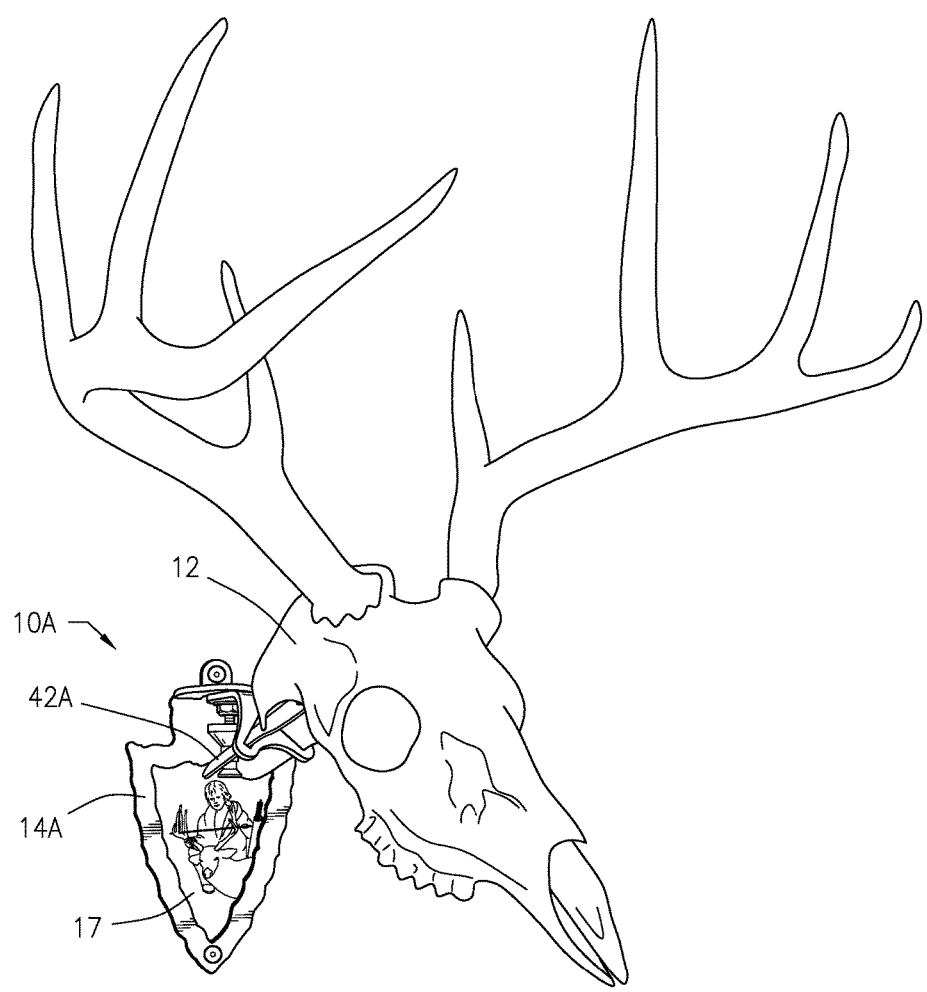
FIG. 26 is a front perspective view of the alternate embodiment skull mount of FIG. 24 shown with a skull attached.

Also referring to FIGS. 21 and 22, because the stinger bracket 26 is rotatably attached to the threaded stud 24, this allows the stinger 42 and attached skull 12 to be rotated relative to the base 14, 14' or 14".

An animal skull 12 can be attached to an opposite distal end 50 of the stinger 42 so as to display the skull 12. A skull attachment opening 52 is provided in the distal end 50 of the stinger 42 to facilitate attachment of a skull 12 to the stinger 42.

Gravity holds the stinger 42 is in place within the inverted v-shaped opening 38 of the stinger bracket 26 and resting on the indented area 46 of the knob 44. Thus, the stinger 42 can easily be lifted off of the knob 44 and pulled through the inverted v-shaped opening 38 of the stringer bracket 26 to remove the stinger 42 and attached skull 12 from the rest of the skull mount 10. The stinger is removable which facilitates marketing, packaging and distribution requirements in addition to making it easier to attach a skull to it.

Referring now to FIGS. 23-26, an alternate embodiment skull mount 10A is shown. The alternate embodiment skull mount 10A differs from the skull mount 10 in only two features. First, the alternate embodiment skull mount 10A includes a third alternate base 14A that is provided with a cut out area or portion 15 that forms a frame behind which can be secured a photo of the person harvesting the animal whose skull is to be secured thereto, i.e. the harvest image 17, or which can be used to display information about the harvest, such as date, time, and location of harvest.

Second, the alternate embodiment skull mount 10A includes an alternate stinger 42A that is provided each of its sides with a stabilizer 43. These stabilizers 43 insert into the skull 12 to help lock it in place on the alternate stinger 42A to prevent rotation of the skull 12 on the alternate stinger 42A.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A skull mount for mounting an animal skull on a wall comprising:
   a base that can be secured to a surface, a threaded stud attached to the base,
   a stinger bracket rotatably attached to the threaded stud so that an attached stinger rotates with the rotation of the stinger bracket,
   the stinger bracket provided with an opening extending there through, a first end of the stinger removably insertable through the opening of the stinger bracket, said stinger provided with a stabilizer on each side of the stinger,
   a knob rotatably secured on the threaded stud below the stinger bracket, and
   the first end of the stinger removably engageable with the knob so that the stinger rests thereon.

2. A skull mount according to claim 1 further comprising:
   an arm provided on the base at approximately a right angle, said threaded stud attached to the arm so that the threaded stud is approximately parallel with the base.

3. A skull mount according to claim 1 further comprising:
   said stinger bracket being angled.

4. A skull mount according to claim 1 further comprising:
   washers provided on the threaded stud above and below the stinger bracket.

5. A skull mount according to claim 4 further comprising:
   a nut securing the stinger bracket and washers to the threaded stud.

6. A skull mount according to claim 1 further comprising:
   said base provided with a flat portion that is securable to a wall.

7. A skull mount according to claim 6 further comprising:
   said base provided with attachment openings and fasteners for inserting though the attachment openings to secure the base to a surface.

8. A skull mount according to claim 1 further comprising:
   said opening in the stinger bracket being an inverted v-shaped opening, and said stinger having a cross sectional shape that is an inverted v-shape.

9. A skull mount according to claim 1 further comprising:
   an indented area provided on said knob as a point of engagement with the stinger such that the stinger rests upon the indented area of the knob, and rotation of the knob effectively changes the angle of the stinger.

10. A skull mount according to claim 9 further comprising:
    a groove in the proximal end of the stinger removably engageable with the indented area of the knob so that the stinger rests thereon.

11. A skull mount according to claim 1 further comprising:
    means for securing an animal skull to a free end of the stinger.

12. A skull mount according to claim 1 wherein the base is formed into a decorative shape and design.

13. A skull mount according to claim 1 further comprising:
    said base provided with a cut out portion forming a frame for a photograph or harvest information.

14. A skull mount for mounting an animal skull on a wall comprising:
    a base that can be secured to a surface, said base provided with a cut out portion forming a frame for a photograph or harvest information, a threaded stud attached to the base,
    a stinger bracket rotatably attached to the threaded stud so that an attached stinger rotates with the rotation of the stinger bracket,
    the stinger bracket provided with an opening extending there through, a first end of the stinger removably insertable through the opening of the stinger bracket,
    a knob rotatably secured on the threaded stud below the stinger bracket, and
    the first end of the stinger removably engageable with the knob so that the stinger rests thereon.

15. A skull mount according to claim 14 further comprising:
    an arm provided on the base at approximately a right angle, said threaded stud attached to the arm so that the threaded stud is approximately parallel with the base.

16. A skull mount according to claim 14 further comprising:
    said stinger bracket being angled.

17. A skull mount according to claim 14 further comprising:
    washers provided on the threaded stud above and below the stinger bracket.

18. A skull mount according to claim 17 further comprising:
    a nut securing the stinger bracket and washers to the threaded stud.

19. A skull mount according to claim 14 further comprising:
    said base provided with a flat portion that is securable to a wall.

20. A skull mount according to claim 19 further comprising:
    said base provided with attachment openings and fasteners for inserting though the attachment openings to secure the base to a surface.

21. A skull mount according to claim 14 further comprising:
    said opening in the stinger bracket being an inverted v-shaped opening, and said stinger having a cross sectional shape that is an inverted v-shape.

22. A skull mount according to claim 14 further comprising:
    an indented area provided on said knob as a point of engagement with the stinger such that the stinger rests upon the indented area of the knob, and rotation of the knob effectively changes the angle of the stinger.

23. A skull mount according to claim 22 further comprising:
a groove in the proximal end of the stinger removably engageable with the indented area of the knob so that the stinger rests thereon.

24. A skull mount according to claim 14 further comprising:
means for securing an animal skull to a free end of the stinger.

25. A skull mount according to claim 14 wherein the base is formed into a decorative shape and design.

* * * * *